Oct. 29, 1946.    D. E. KENYON    2,410,081
ELECTRIC CIRCUIT
Filed Oct. 22, 1943

INVENTOR
DAVID E. KENYON
BY *Paul B Hunter*
ATTORNEY

Patented Oct. 29, 1946

2,410,081

UNITED STATES PATENT OFFICE 2,410,081

ELECTRIC CIRCUIT

David E. Kenyon, Smithtown, N. Y., assignor to Sperry Gyroscope Company, Inc., a corporation of New York Application October 22, 1943, Serial No. 507,234

9 Claims. (Cl. 178—44)

My invention relates to electric circuits.

An object of my invention is to provide an improved gate shaping arrangement.

It is an object of my invention to provide methods and apparatus for producing current or voltage pulses or gates of suitable shapes for controlling apparatus which is adapted to have its sensitivity or other characteristics varied by the application of variable voltages or currents.

Still another object of my invention is to provide an arrangement for producing a shaped gate representing a root curve, especially a square root curve.

More particularly, it is an object of my invention to provide an arrangement for producing a current or a voltage, the strength of which varies in time in accordance with a root function of time.

Still another object of my invention is to provide an arrangement for supplying a control gate such as a sensitivity gate to the receiver of an object locating system.

Other and further objects and advantages will become apparent as the description proceeds.

In certain types of object locating systems a pulsed microwave radio transmitter and a corresponding receiver are arranged for obtaining an indication of the presence of the object by the reception of reflected waves. A cathode ray tube is arranged so as to be responsive to the receiver for producing indications on its fluorescent screen in response to reflections from detected objects, and the cathode ray beam is swept along one axis of the screen as a time base to give indications of range. For maintaining uniform definition for indications of different ranges, a gate-shaping circuit is preferably provided in the receiver which increases the voltage sensitivity of the system with the passage of time substantially in accordance with the square root law.

In carrying out my invention in accordance with a preferred form thereof, I provide a vacuum tube circuit with a shunt consisting of a pulse-shaping network. The network consists of several different elements having exponential time characteristics so combined as to produce a substantially root function characteristic such as a square root characteristic. Means are provided for supplying a square pulse to the electronic circuit, and means are provided for isolating or amplifying the output and shaping the output wave so as to produce a voltage or a current varying in accordance with a root function of time.

Figure 1:
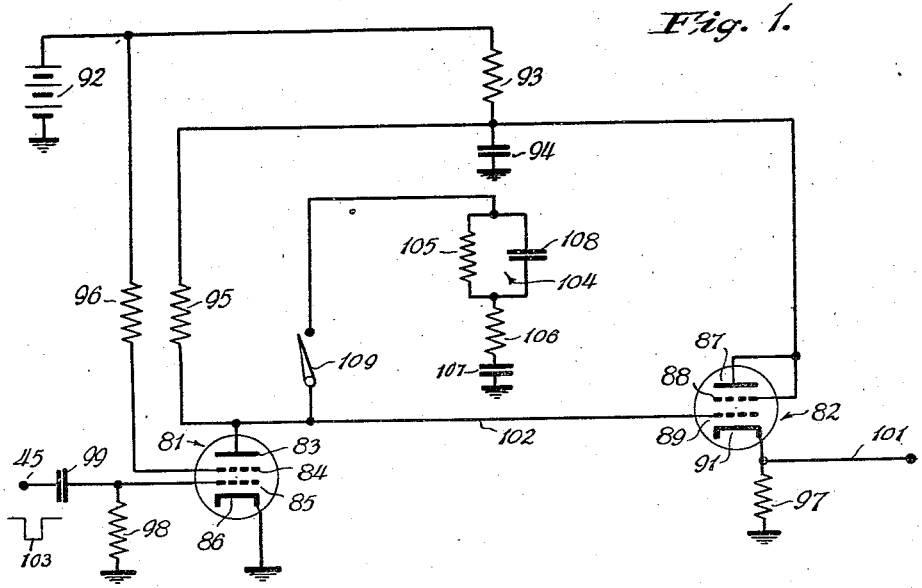
Figure 2:
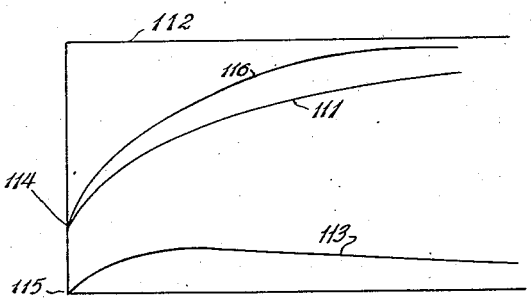

A better understanding of the invention will be afforded by the following detailed description, considered in connection with the accompanying drawing, wherein Fig. 1 is a circuit diagram of a gate-shaping circuit which may be employed for controlling the sensitivity of a pulsed microwave radio receiver; and Fig. 2 is a graph illustrating the principle of operation of the apparatus of Fig. 1.

It may be shown that in pulsed microwave object locating systems the received power varies inversely as the fourth power of range of the object, and, likewise, the corresponding voltage varies inversely as the square of the range. For the sake of causing the target always to appear just within the measurement of range of the apparatus, the receiver sensitivity may be made to vary inversely with the pick-up from reflections. To this end, a gate shaping circuit is desirable so as to cause the sensitivity of the receiver, in terms of voltage, to vary in accordance with the square root of the time elapsing after each pulse is transmitted by a transmitter of the pulse microwave object locating system. Since the time required for a pulse to be transmitted and reflected back to the point of transmission is proportional to the range, the sensitivity of the receiver is thus caused to vary in accordance with the square root of the range.

The term "gate" as used in the present application, is meant to signify a voltage or current pulse which is adapted for controlling a device such as a receiver, for example, by controlling its sensitivity. If the sensitivity of the receiver is made proportional to the control voltage or gate, it will pass signals when the control voltage exceeds a predetermined value, and it will reject signals when the control voltage is below a predetermined value. In this sense the "gate" connotes means for opening or closing the circuit. By the term "gate-shaping," I mean to signify time variation in the strength of the current or voltage pulse utilized for controlling other apparatus so as to vary the strength of the received signal or the like in accordance with variations in the amplitude of the gate.

The gate-shaping circuit of Fig. 1 may comprise a pair of stages 81 and 82 of electric discharge devices, such as tetrode vacuum tubes, for example. In the form illustrated, the tube 81 has an anode 83, a screen grid 84, a control electrode or grid 85, and a cathode 86. The tube 82 may be triode connected, having an anode 87 and a screen grid 88 connected together, a control grid or electrode 89 and a cathode 91. A source of anode voltage 92 is provided, which may be grounded on the negative side and connected on the positive side to the anodes of the tubes 81 and 82. Preferably a de-coupling network comprising a resistor 93 and a condenser 94 is provided and a load resistor 95 is interposed in series with the anode 83 of the tube 81. Source 92, together with resistors 93 and 95, may be considered as a source of potential having appreciable resistance. A dropping resistor 96 may be connected between the positive terminal of power supply 92 and the screen grid 84 of the tube 81. The cathode 86 of the tube 81 is shown directly grounded and the cathode 91 of tube 82 is shown as grounded through a cathode resistor 97. The grid 85 of the tube 81 is zero biased through a grid leak resistor 98 and is coupled to a synchronizing connection 45 through a coupling condenser 99. The cathode 91 of the tube 82 is adapted to be connected through a conductor 101 to the sensitivity control terminal of a receiver (not shown), for example to a suitable terminal of an intermediate frequency amplifier in case the receiver is of the superheterodyne type.

The grid 89 of the tube 82 is coupled by a direct connection 102 to the anode 83 of the tube 81. For converting a square negative input gate 103 from a video receiver (not shown) into a shaped positive pulse, a circuit 104 is shunted across the tube 81. The circuit 104 as illustrated comprises a pair of resistors 105, 106 in series with a condenser 107, with an additional condenser 108 shunting the resistor 105. If desired, a changeover switch 109 may be interposed between the anode 83 and the upper end of the resistor 105.

When no shaping is desired, the switch 109 is thrown to the left to open the circuit, and, when a shaped sensitivity gate is desired in order to produce high definition of the indicator spot, the switch 109 is thrown to the right to close the circuit.

The shaping circuit 104 produces a square root curve by approximation from a combination of two exponential curves. For example, referring to Fig. 2, the normal exponential charging curve which would be characteristic of resistor 106 in series with condenser 107 (assuming omission of the network 104) is the curve 111 which will be found to be a long sloping curve gradually becoming asymptotic to the horizontal line 112 representing the voltage of the source 92. On the other hand, the voltage characteristic across network 104 is the curve 113, which rises and then falls due to the non-linear current flow through network 104.

When both elements 105 and 108 are present, the circuit initially acts as if only the resistor 106 were present, since the condenser 108 shunts the resistor 105 and the resistor 105 therefore does not limit the initial charging current. On the other hand, after the condenser 108 has become substantially charged, the condenser 108 has relatively little effect and the charging tends to follow the curve 111. Thus the combination circuit tends to follow a charging curve represented by the curve 116, Fig. 2, which is the sum of curves 111 and 113 and which corresponds substantially to a parabola or square root curve in which the rate of increase tapers off with the passage of time.

It will be understood that before the negative gate 103 is applied to the tube 81, since it is zero biased, relatively large current flows therein and the voltage is at a minimum value. Thus this tube serves as a relatively low-impedance path, in shunt with the network comprising elements 105—108, which may be selectively removed by rendering tube 81 non-conductive. However, when the negative gate 103 is impressed on the grid 85 it is driven beyond negative cutoff and the voltage of the anode 83 would immediately rise to the voltage of the source 92 if the shaping circuit were not connected across the tube 81. When this shaping circuit is present current is maintained through the load resistor 95 and the anode potential follows the curve 116 as already explained. Since the tube 82 acts as an impedance transformer and a cathode follower, the anode voltage of the tube 81 is reproduced as current in the resistor 97, and as voltage at the output conductor 101.

In one successful embodiment of the invention in accordance with Fig. 1, vacuum tubes 81 and 82 were each a type 6V6, and source 92 had a potential of 300 volts. The following values of resistance and capacitance were employed:

| | | |
|---|---|---:|
| Resistor 93 | ohms | 1,000 |
| Resistors 95, 97 and 105 | do | 10,000 |
| Resistor 96 | do | 13,000 |
| Resistor 98 | megohms | 1.0 |
| Resistor 106 | ohms | 2,400 |
| Condenser 94 | microfarads | 1.0 |
| Condensers 99 and 107 | do | 0.01 |
| Condenser 108 | do | 0.05 |

With the above typical values of components, the voltage at an anode 83 of tube 81 with respect to ground varied with time substantially as indicated by curve 116 of Fig. 2.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. A circuit for providing a voltage having a square-root function with respect to time, comprising in combination: a source of potential having appreciable resistance; a series network comprising a resistance element, a capacitance element, and a shunt resistance-capacitance element, said network being connected across said source; and means adapted selectively to provide a relatively low-impedance path in shunt with said network; whereby said voltage is developed across said network upon removal of said path.

2. A circuit for providing a recurrent voltage having a square-root function with respect to time, comprising in combination: a source of potential having appreciable resistance; a series network comprising a resistance element, a capacitance element, and a shunt resistance-capacitance element, said network being connected across said source; and means adapted selectively to provide a relatively low-impedance path in shunt with said network; whereby said voltage is developed across said network upon the periodic removal of said path.

3. A circuit for providing a voltage having a square-root function with respect to time, comprising in combination: a source of potential having appreciable resistance; a series network comprising a resistance element, a capacitance element, and a shunt resistance-capacitance element, said network being connected across said source; and means comprising an electronic device adapted selectively to provide a relatively low-impedance path in shunt with said network; whereby said voltage is developed across said network upon removal of said path.

4. A circuit for providing a recurrent voltage having a square-root function with respect to time, comprising in combination: a source of potential having appreciable resistance; a series network comprising a resistance element, a capacitance element, and a shunt resistance-capacitance element, said network being connected across said source; and means comprising an electronic device adapted selectively to provide a relatively low-impedance path in shunt with said network; whereby said voltage is developed across said network upon the periodic removal of said path.

5. A circuit for providing a voltage having a square-root function with respect to time, comprising in combination: a source of potential having appreciable resistance; a series network comprising a first resistor, a first condenser, and a shunt-connected second resistor and second condenser, said network being connected across said source and the time constant of said two resistors and said second condenser together being less than that of said second resistor and said two condensers together; and means adapted selectively to provide a relatively low-impedance path in shunt with said network; whereby said voltage is developed across said network upon removal of said path.

6. A circuit for shaping a square wave or the like, comprising: an electronic device having input and output terminals; means for applying said square wave to said input terminals; a source of potential having appreciable resistance connected between said output terminals; a series network connected between said output terminals and comprising a resistance element, a capacitance element, and a shunt resistance-capacitance element; and means for utilizing the shaped wave developed between said output terminals.

7. A circuit for shaping a square wave or the like, comprising: an electronic device having input and output terminals; means for applying said square wave to said input terminals; a source of potential having appreciable resistance connected between said output terminals; a series network shunting said output terminals and including a pair of series-connected circuit units each having a substantially exponential voltage-time characteristic, one of said units having a shorter time constant than the other; and means for utilizing the shaped wave developed between said output terminals.

8. A circuit for shaping a square wave or the like, comprising: an electronic device having input and output terminals; means for applying said square wave to said input terminals; a source of potential having appreciable resistance connected between said output terminals; a series network shunting said output terminals and comprising a first resistor, a first condenser, and a shunt-connected second resistor and second condenser, the time constant of said two resistors and said second condenser together being less than that of said second resistor and said two condensers together; and means for utilizing the shaped wave developed between said output terminals.

9. A circuit for shaping a square wave or the like, comprising in combination: an electronic device having a cathode, an anode and a control electrode; means for applying said square wave between said control electrode and said cathode; means including a series impedance for applying a positive potential to said anode with respect to said cathode; a series network connected between said anode and said cathode comprising a resistance element, a capacitance element, and a shunt resistance-capacitance element; and means for utilizing the shaped wave developed between said anode and said cathode.

DAVID E. KENYON.